Figure 1:
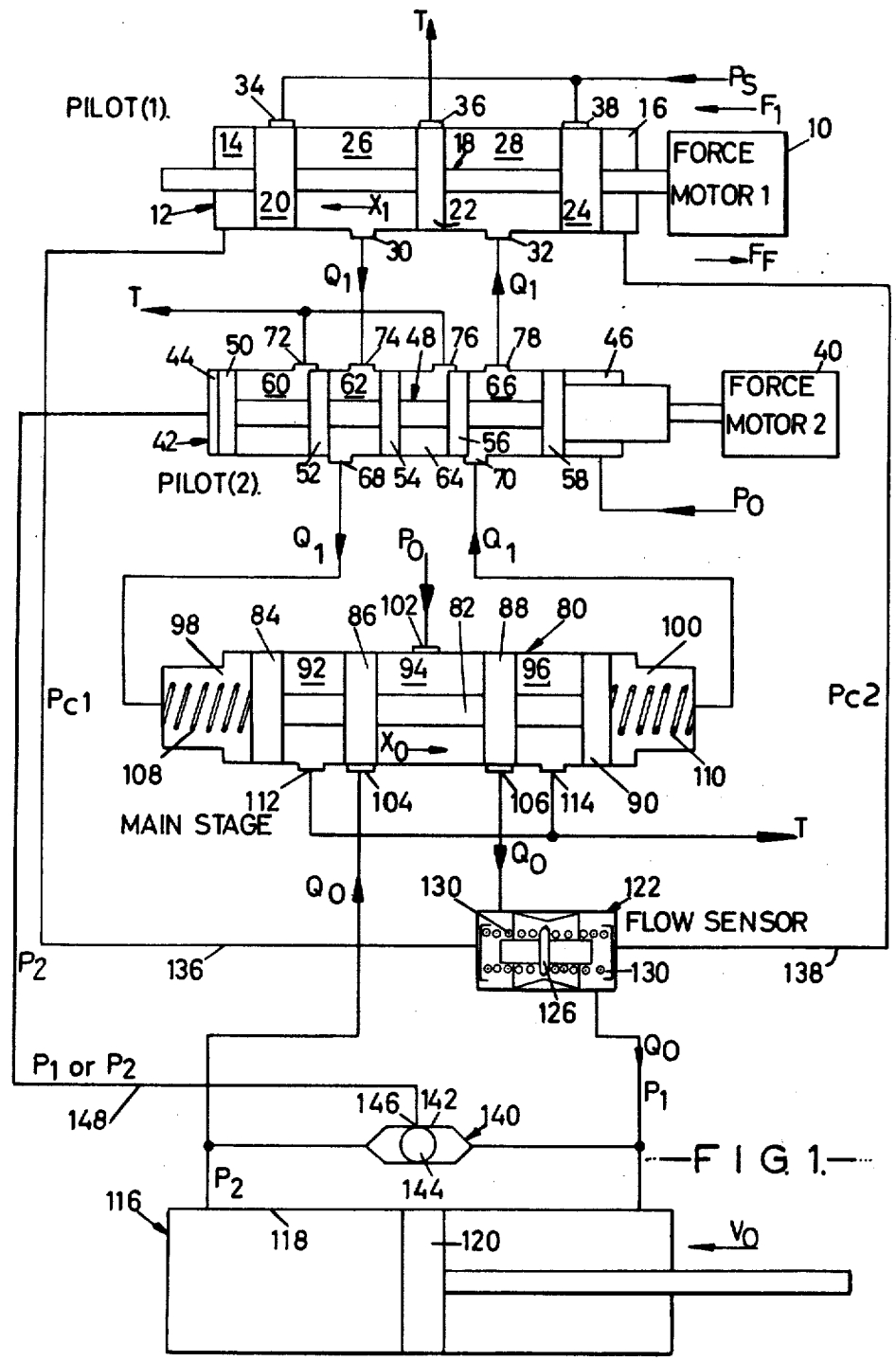

United States Patent
Walters et al.

[11] 3,878,765
[45] Apr. 22, 1975

[54] HYDRAULIC ACTUATOR CONTROLS

[75] Inventors: Ronald Bernard Walters, Wembley; Donald Alexander Larner, Kingston-upon-Thames, both of England

[73] Assignee: Sperry Rand Limited, London, England

[22] Filed: Mar. 1, 1973

[21] Appl. No.: 337,107

Related U.S. Application Data
[62] Division of Ser. No. 104,020, Jan. 5, 1971, abandoned.

[52] U.S. Cl. .................................. 91/433; 91/461
[51] Int. Cl. ..................... F15b 11/10; F15b 13/042
[58] Field of Search ... 91/433, 461; 137/106, 625.6, 137/625.66, 625.63

[56] References Cited
UNITED STATES PATENTS

| | | | |
|---|---|---|---|
| 2,188,834 | 1/1940 | Fischel et al. | 91/433 X |
| 2,909,195 | 10/1959 | Keyt | 91/433 X |
| 3,038,498 | 6/1962 | Seavey | 91/433 X |
| 3,092,137 | 6/1963 | Thieme et al. | 137/493 |
| 3,487,750 | 6/1970 | Borgeson | 91/433 X |
| 3,555,969 | 1/1971 | Shah | 91/461 |

FOREIGN PATENTS OR APPLICATIONS

| | | | |
|---|---|---|---|
| 74,977 | 3/1945 | Czechoslovakia | 91/433 |
| 1,426,471 | 11/1968 | Germany | 91/461 |
| 609,808 | 10/1948 | United Kingdom | 91/433 |

*Primary Examiner*—Irwin C. Cohen
*Attorney, Agent, or Firm*—Barnes, Kisselle, Raisch & Choate

[57] ABSTRACT

A device for controlling the flow of fluid to or the pressure of fluid applied to a hydraulic actuator comprises a pilot valve for controlling a pressure operated main valve. A transducer converts an electrical input signal into a force which is applied to the pilot valve spool. A feedback pressure is applied to piston means on or associated with the spool to apply a force thereto in opposition to the first-mentioned force. For flow control a flow sensor produces a feedback pressure differential dependent on the flow of fluid to the actuator. For pressure control a pressure sensing means produces a pressure equal to the higher of the operating pressures of the actuator.

Flow and pressure control can be optionally obtained by providing two pilot valves in series, one responsive to the flow sensor and the other responsive to the pressure sensing means. One of the pilot valves is set to override the feedback signal thereto, whereby the other pilot valve becomes effective as desired.

6 Claims, 8 Drawing Figures

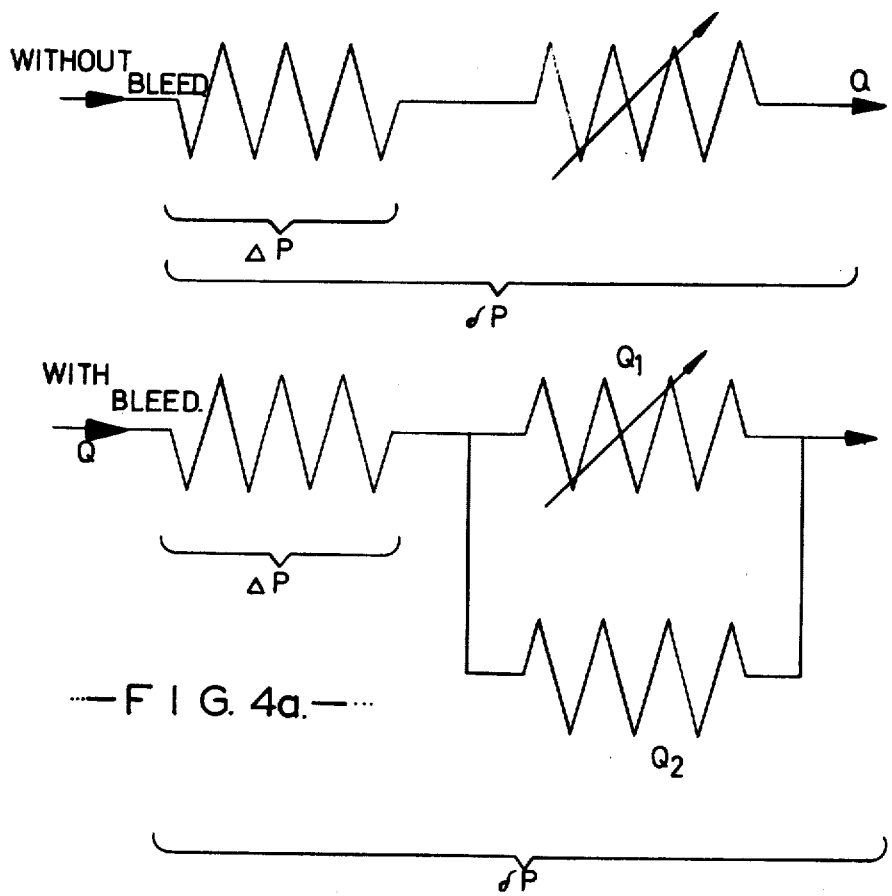
— FIG. 4a. —
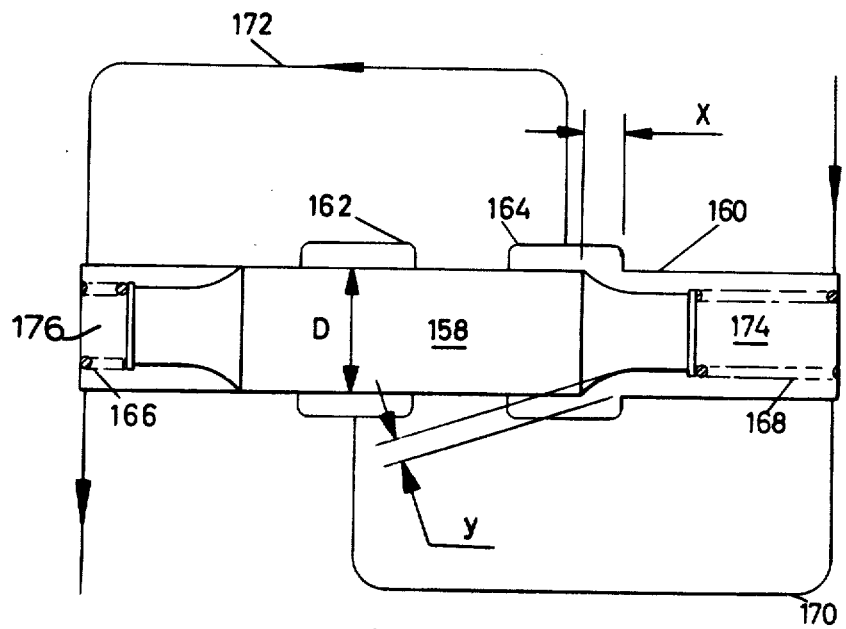
— FIG. 5. —

HYDRAULIC ACTUATOR CONTROLS

This is a division of application Ser. No. 104,020, filed Jan. 5, 1971, and now abandoned.

This invention relates to hydraulic actuator controls.

It is a primary object of the present invention to provide directional and modulated flow control of a hydraulic actuator by means of remote electrical signals. It is desirable that the controlled output be unaffected by disturbances such as variations in load supply pressure or the temperature.

It is another object of the invention to provide directional and modulated control of load pressure drop across a hydraulic actuator also by means of remote electrical signals.

It is a further object of the present invention to combine flow control with a pressure limiting factor derived from a pressure actuated control system and furthermore to combine all the necessary units into a single integral unit.

According to one aspect of the present invention a device for controlling the flow of fluid to a hydraulic actuator in response to an electrical input signal comprises transducer means producing a force proportional to an electrical input signal, pilot valve means including spool means displaceable by said force and by piston means associated with said spool means to cause fluid under pressure to be supplied to main control valve means to operate same and cause fluid under pressure to be supplied to the actuator, flow sensing means in the fluid path between the main valve means and the actuator to provide a differential pressure proportional to the flow of fluid therethrough and feed back means for applying said differential pressure to the piston means in the pilot valve means in a direction which reduces the net force acting on said spool means.

According to another aspect of the present invention a device for controlling the pressure of fluid to a hydraulic actuator in response to an electrical input signal comprises transducer means producing a force proportional to an electrical input signal, pilot valve means including spool means displaceable by said force and by piston means associated with said spool means to cause fluid under pressure to be supplied to main control valve means to operate same and cause fluid under pressure to be supplied to the actuator, pressure sensitive valve means connected to the actuator and including piston means displaceable in response to a pressure differential across the movable member of the actuator to open an output port, and feed back means between the output port and the pilot valve means for applying the higher pressure present in the actuator to the piston means in the pilot valve means in a direction to reduce the net force acting on said spool means.

According to a further aspect of the present invention a device for generating a pressure differential as a measure of fluid flow comprises two chambers separated by a movable member which is movable against spring means in consequence of a pressure differential thereacross to allow a controlled flow from the chamber at the higher pressure to the chamber at the lower pressure.

In a preferred embodiment of the said further aspect of the invention the two chambers are generally cylindrical and are joined by a throat of reduced diameter. The movable separating member is advantageously a disc. The separating disc member is situated in the throat, the mid-position of the disc member corresponding to the smallest diameter region of the throat. Springs are provided on opposite sides of the disc. A pressure differential between opposite sides of the disc causes the latter to move axially against one of the springs thus enlarging the throat opening. The diameter of the throat increases with axial distance from the region of minimum diameter and the profile of the throat on either side of this region is selected so that the relationship between flow through the throat and pressure differential across the disc is substantially linear.

In another embodiment of said further aspect of the invention there is provided a piston slidable in a cylinder, spring means in the cylinder urging the piston towards one end of the cylinder, an annular cavity in the cylinder wall normally covered by the piston, fluid inlet means at said one end of the cylinder and fluid outlet means at the other end of the cylinder and a fluid path between an annular cavity and the said other end of the cylinder, the end region of the piston registering in the annular cavity being shaped so as to define with the upstream edge of the cavity, an orifice, the pressure differential across which is directly proportional to the flow of fluid therethrough.

Conveniently the flow sensing device is of symmetrical construction and includes a piston having tapered ends and a cylinder having two axially spaced apart annular cavities each of which are covered by the piston when the latter occupies a mid-position but which may be exposed separately by movement of the piston in one direction or the other. Two fluid connections are required one between one annular cavity and the opposite end of the cylinder and the other between the other annular cavity and the other opposite end of the cylinder. In this way the flow sensing device can produce a differential pressure in one direction or the other depending on the direction of flow.

Conveniently, a device according to the first aspect of the invention is combined in a single control unit with a device according to the second aspect of the present invention. In a typical arrangement the pilot valve means of the first mentioned device (hereinafter referred to as the first pilot valve) and the pilot valve means of the second mentioned device (hereinafter referred to as the second pilot valve) are connected in series and provide a single output for application to a single main control valve and actuator the second pilot being invested with an overriding control function. Feed back from a flow sensing device in the output from the main valve to the actuator is applied to the first pilot valve and feed back from pressure sensitive valve means connected to the actuator, is applied to the second pilot valve.

In such an arrangement the device can be employed to provide directional and modulated flow control to the hydraulic actuater with pressure relief at a given fluid pressure in the actuator. To this end a constant force is applied to the spool means of the second pilot valve to oppose the feed back from the pressure sensitive valve means. In the event that the pressure detected by the latter in the actuator exceeds the pressure set by the constant loading on the spool in the second pilot valve, the latter is overcome and the second pilot valve is actuated so as to connect the main valve control chambers to tank allowing the main spool to move partially or fully to neutral under the action of the centering springs, thereby partially or completely shutting off the supply of fluid to the actuator.

Alternatively, the arrangement may be adapted to provide load pressure control with a limit on the maximum flow to and from the actuator. To this end the first pilot valve is subjected to a constant loading corresponding to the maximum flow to and from the actuator which is to be allowed. In the event that this is exceeded the feed back from the flow sensing device will cause the pilot valve to change polarity causing the main valve spool displacement to be reduced, thereby reducing the supply of fluid to the actuator. Any resultant load pressure drop will cause the second pilot to be unbalanced in such a way as to offer reduced resistance, thereby vesting authority in the first pilot valve.

Preferably, each pilot valve and main valve is made symmetrical and includes two completely separate single or multiple fluid path arrangements to provide flow and return valve means.

Conveniently, the pressure sensitive valve means connected to the actuator comprises a shuttle valve comprising a free piston in the cylinder, opposite sides of the piston being exposed to the pressure present in opposite end regions of the hydraulic actuator. The cylinder includes a single outlet which is exposed by movement of the piston in one direction or the other in response to a pressure differential prevailing between opposite ends of the hydraulic actuator cylinder.

In the pressure control mode, the main valve provides flow-pressure conversion. At zero or very low flow ratio however the system would be liable to be unstable in the absence of an external flow-pressure converter. This is automatically provided in the case of a viscous load but where the load is not viscous a shunt may be provided across the two service lines. In situations where such a shunt would be unacceptable under operating conditions a solenoid operated blocking valve would be required in series with the shunt.

In an alternative arrangement the shunt may take the form of a controlled bleed from the higher of the two service line pressures to tank. In order to inhibit the shunt in the velocity control mode of operation and in case of signal failure, an additional port connected to tank from a preset orifice may be provided in one end of the second pilot valve, the port being blocked by the spool means in the pilot valve when it is fully displaced in either direction.

Figure 2:
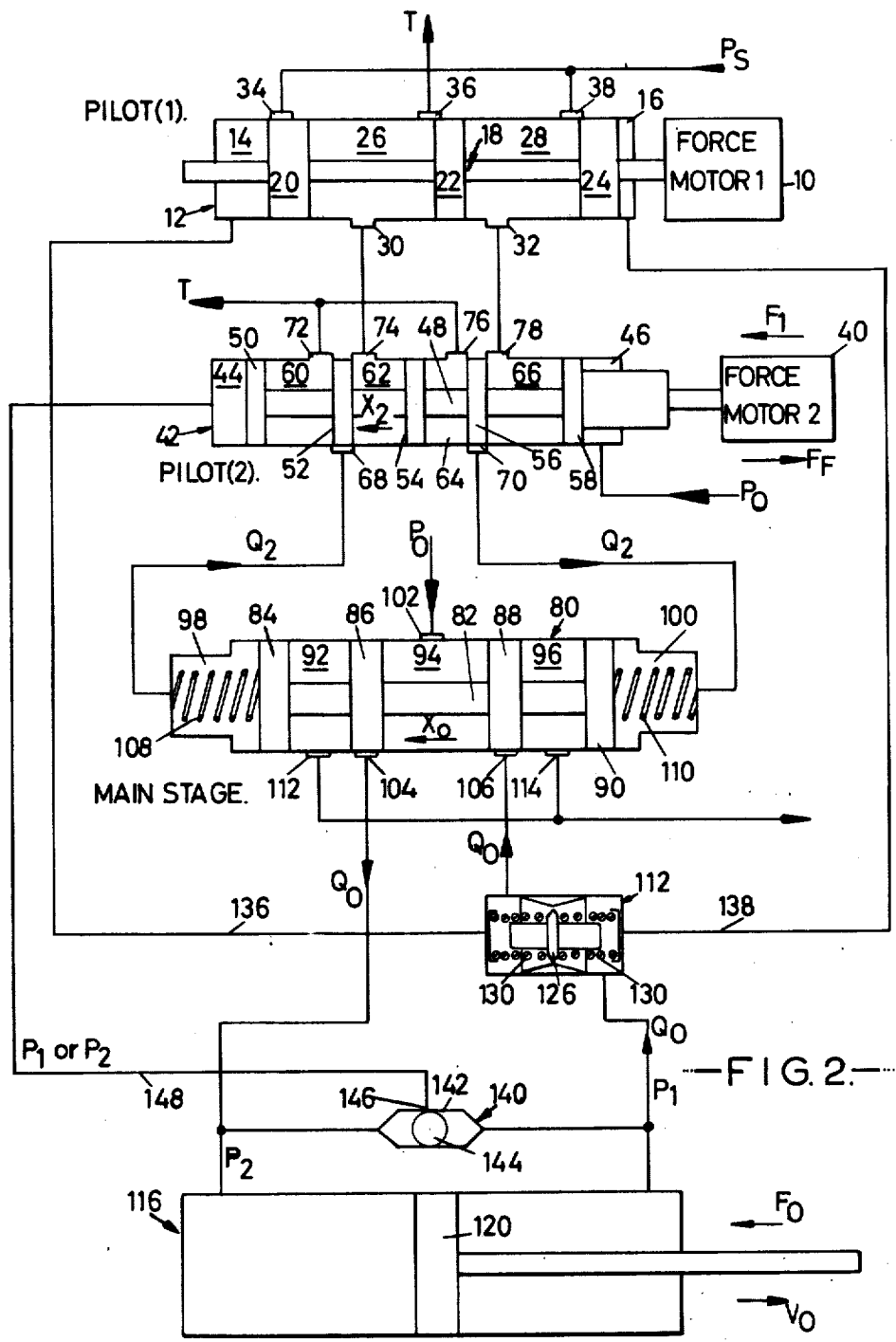
Figure 3:
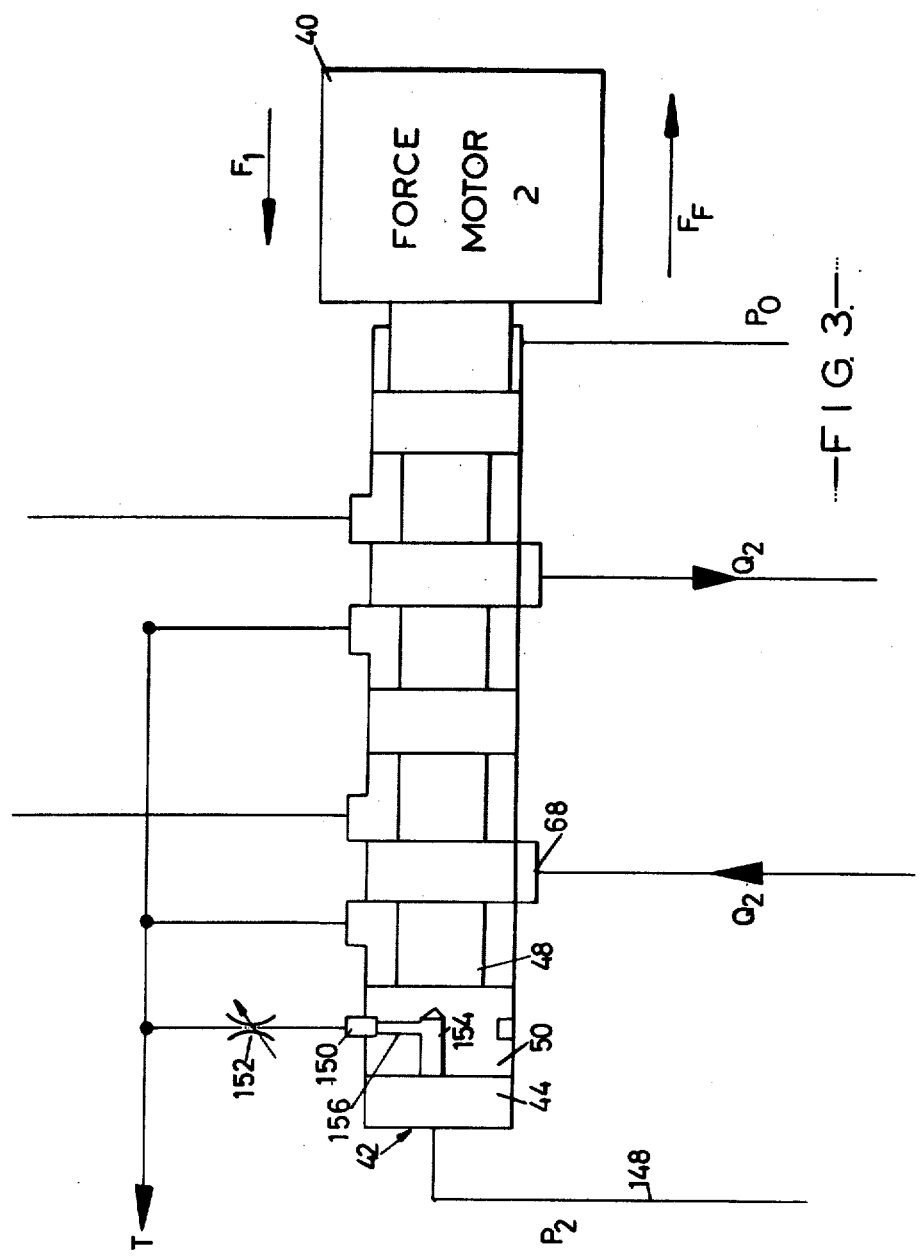
Figure 4:
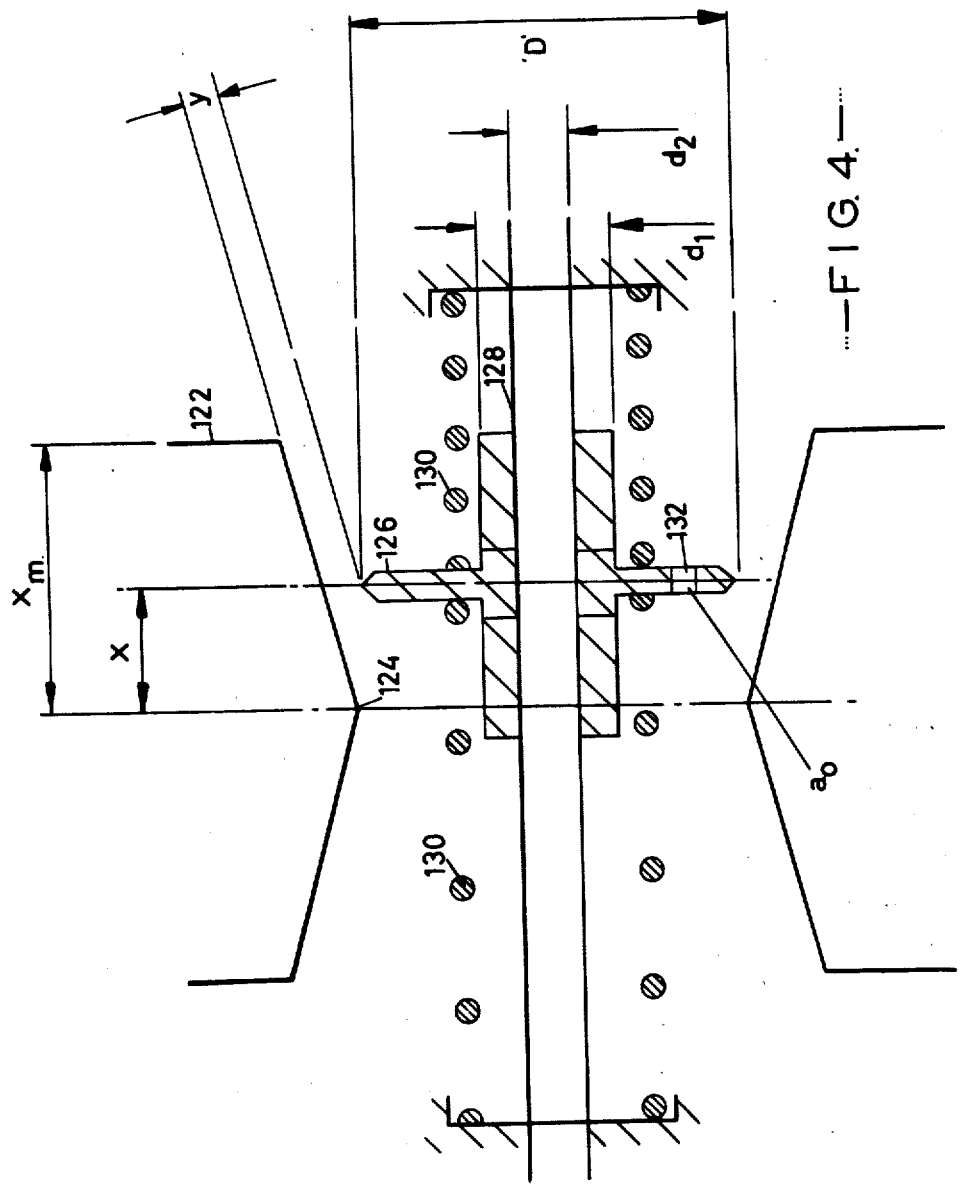
Figure 6:
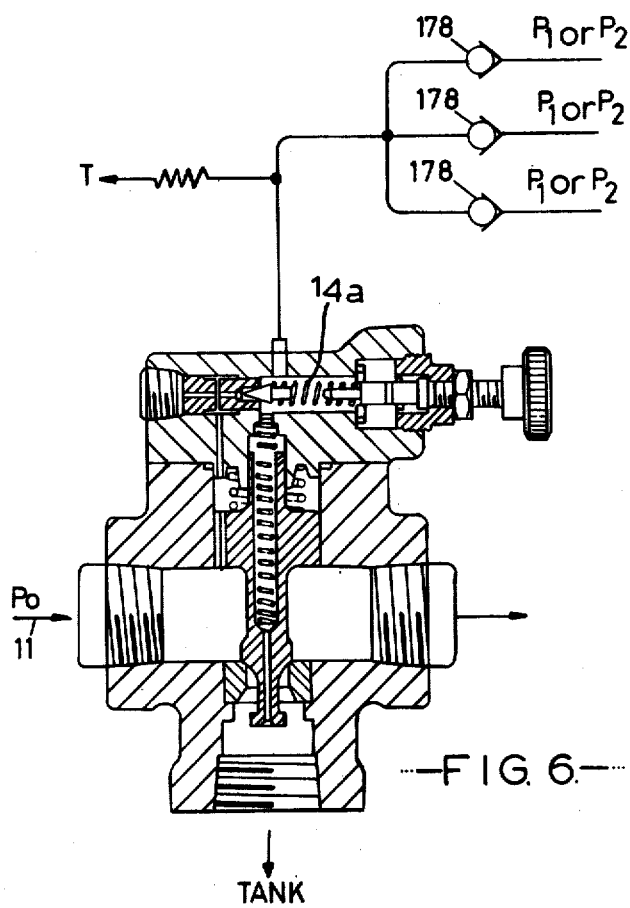
Figure 7:
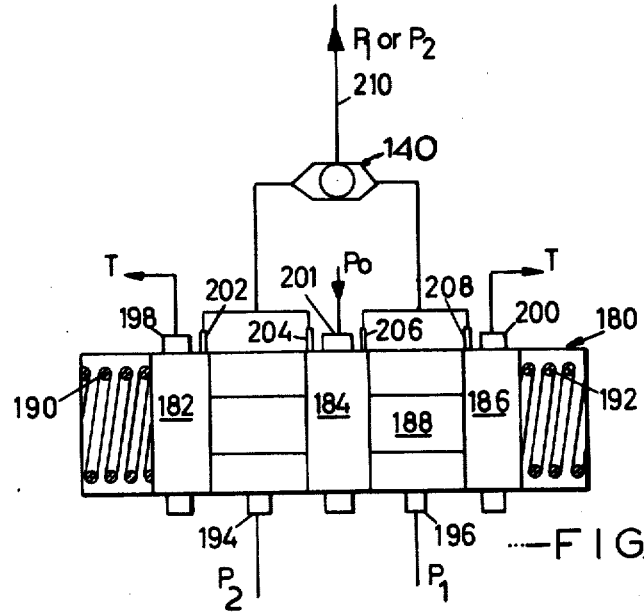

The invention will now be described by way of example with reference to the accompanying drawings in which:

FIG. 1 is a circuit diagram of a multiple control valve in flow control mode constructed as one embodiment of the invention, FIG. 2 is a circuit diagram of the same multiple control valve as shown in FIG. 1 in a pressure control mode, FIG. 3 illustrates an alternative second pilot in the multiple control valve in order to provide a controlled bleed in the pressure controlled mode of operation, FIG. 4 is a diagrammatic cross-section of a preferred form of flow sensor, FIG. 4a illustrates equivalent circuits for the flow sensor of FIG. 4, FIG. 5 is a diagrammatic cross-section of another flow sensor, FIG. 6 is a cross-section of a pressure matching device between the source of hydraulic fluid under pressure and the multiple control valve, and FIG. 7 illustrates an alternative main valve which may be used in the multiple control valve of FIGS. 1 and 2.

In FIGS. 1 and 2 there is shown the circuit diagram of a multiple control valve by which the flow and pressure of hydraulic fluid supplied to an actuator may be controlled. The multiple control valve is conveniently of modular construction and comprises the following sub-units:

1. A flow control pilot valve (pilot 1).
2. A pressure control pilot valve (pilot 2).
3. A main control valve (main stage).
4. A flow sensor, and
5. A pressure sensitive shuttle valve.

Conveniently, the flow sensor and shuttle valve are housed in a single so-called sandwich plate which may be interposed between the main stage and either an adaptor block or manifold.

Referring to FIG. 1 and FIG. 2 in detail, pilot 1 comprises a linear force motor 10 which produces a force of appropriate polarity proportional to an electrical input current and a 4-way throttle valve 12 having feed back chambers 14, 16 of equal area at opposite ends of the spool 13. The spool carries three lands 20, 22, 24 which define between them two chambers 26, 28. Fluid ports 30, 32 are provided from the chambers 26, 28 for supplying fluid to and/or receiving fluid from a subsequent stage. Three further fluid ports 34, 36, 38 are provided which are closed by the three lands 20, 22, 24 respectively when the spool 18 is in its central position (that shown in FIG. 1).

Pilot 2 comprises a second linear force motor 40 which produces a force proportional to an input electrical current and a 5-way throttle valve 42 having differential feed back chambers 44, 46 at opposite ends of the spool 48. The spool carries five pistons 50, 52, 54, 56, 58 which between them define four chambers 60, 62, 64, 66. By employing a different effective area on which fluid pressure in the chambers 44, 46 can operate on the ends of the lands 50 and 58, a differential between the two feed back chambers of 2:1 can be obtained.

Fluid ports 68, 70 are blocked by lands 52, 56 when the spool occupies a central position. Further fluid ports 72, 74, 76, 78 communicate with chambers 60, 62, 64, 65 respectively.

Fluid ports 30, 32 of pilot 1 are connected to fluid ports 74, 78 respectively of pilot 2.

Fluid under pressure $P_x$ is supplied from a pressure source such as a pump (not shown) to ports 34, 38 of pilot 1, and port 36 of pilot 1 and also ports 72 and 76 of pilot 2 are connected to tank, i.e. a reservoir of hydraulic fluid from which the pump draws its supply.

The main stage comprises a pilot operated 4-way throttle valve 80 containing a spool 82 having four lands 84, 86, 88, 90 therein. The four lands define three chambers 92, 94, 96 therebetween and the outer faces of the lands 84 and 90 are subjected to the fluid under pressure in pilot flow control chambers of equal area 98, 100 at opposite ends respectively of the valve 80. The pilot flow control chambers 98, 100 are supplied with hydraulic fluid under pressure from ports 68, 70 respectively of pilot 2.

One configuration of valve 80 includes a port 102 central of the middle chamber 94 which is supplied with fluid under pressure at $P_o$. This may be, for example, supplied from the same pump (not shown) which supplies ports 34, 38 in FIG. 1. Main flow ports 104, 106 are provided in the main stage and are covered by the lands 86, 88 when the spool 82 occupies a central position normally adopted by the spool when under no load by virtue of springs 108, 110 respectively at opposite ends of the spool. Further ports 112, 114 which communicate with chambers 92, 96 serve to connect these chambers to tank.

Hydraulic fluid from the main stage is supplied to a double acting actuator 116, comprising a cylinder 118 and a piston 120, through a flow sensor device generally designated 122. The flow sensor 122 which is illustrated in more detail in FIG. 4, comprises a generally cylindrical housing whose internal diameter increases on either side of a region 124 of minimum diameter, and a closure disc 126 slidable on a spindle 128 which extends axially through the housing. The disc is constrained to occupy a mid-position on the spindle when no out-of-balance forces act on opposite sides of the disc, by two springs 130 located on opposite sides of the disc 126 between the disc and the ends of the housing. Fluid connections 136, 138 (FIGS. 1 and 2) from opposite ends of the sensor 122 serve to connect the two chambers on opposite sides of the disc 126 to the feed back pressure chambers 14 and 16 respectively of pilot 1.

The equations governing the performance of the device are as follows (referring also to FIG. 4a):

$$Q = K \delta p \quad (1)$$

$$Q = 100\pi(D + y) y \sqrt{\delta p - \Delta p} \quad (2)$$

$$Q = 100 a_2 \sqrt{\Delta p} \quad (3)$$

$$Sx = \delta p a_1 - \delta a_2 \quad (4)$$

Where $a_1 = \pi/4 (D^2 - d_2^2)$ and $a_2 = \pi/4 (D^2 - d_1^2)$
Combining equations (1) and (2), yields $$y(D+y) = \frac{K\delta p}{100\pi \sqrt{\delta p - \Delta p}}$$

$$y = \frac{-D \pm \sqrt{D^2 + 4c}}{2}$$

$$\text{where } c = \frac{K\delta p}{100\pi \sqrt{\delta p - \Delta p}}$$

In the above expressions units for pressure are p.s.i., for flow cub. inch per second, for areas inch$^2$ and for lengths inches. Effective spring rate S is then in lbs. per inch.

In order to increase sensitivity at very small flow rates, a parallel leakage path can be introduced by means of a hole 132 (or a number of holes) drilled in the disc. The equivalent circuit for this configuration is shown in the second half of FIG. 4a.

Equation (2) is then modified to:

$$Q = 100 [\pi(D + y) y + a_o] \sqrt{\delta p - \Delta p} \quad (2a)$$

and by combining this with equation (1)

$$y(D+y) = \frac{K\delta p}{100\pi \sqrt{\delta p - \Delta p}} - \frac{a_o}{\pi}$$

$$y = \frac{-D \pm \sqrt{D^2 + 4c}}{2} \quad \text{(as before)}$$

$$\text{where } c = \frac{K\delta p}{100\pi \sqrt{\delta p - \Delta p}} - \frac{a_o}{\pi}$$

A pressure sensitive shuttle valve 140 comprises a cylinder 142 having a central outlet port 146 and a free piston 144 (such as a ball) movable in the cylinder to close one or other of two inlet ports at opposite ends of the cylinder 142. The inlet port at one end of the cylinder 142 is in communication with the pressure obtaining at one side of the piston 120 of the actuator 116 and the inlet port at the other end of the cylinder 142 is in communication with the pressure obtaining at the other side of the piston 120 in the actuator 116. The port 146 is connected by a fluid connection 148 to the larger feed back chamber 44 of the two feed back chambers 44, 46 in pilot 2. The smaller chamber 46 is supplied with hydraulic fluid under pressure $P_o$.

FIG. 1 illustrates the multiple control valve in a so-called flow control mode. To explain the sequence of operation it is assumed that the actuator is initially at rest and is required to move at a velocity $V_o$ in the direction indicated in FIG. 1. To initiate the sequence a reference current proportional to the required velocity $V_o$ and a polarity corresponding to the required direction is caused to flow in force motor 1. The resulting out of balance force will cause the spool 18 of pilot 1 to move through a distance $X_1$, say to the left, and this in turn will allow flow of oil $Q_1$ in the direction shown by the arrows from port 30 through chamber 62 and port 68 of pilot 2 to the pilot chamber 98 of the main stage. Displaced fluid from the opposite pilot chamber 100 will return via port 70, chamber 66 and port 78 of pilot 2 and port 32 and chamber 28 of pilot 1 to return to tank. It is to be noted that for flow control operation the spool 48 of pilot 2 must be displaced in a direction away from the force motor 40 associated with pilot 2.

The throttling action of the main valve spool 82 controls the main flow $Q_o$ to and from the actuator 116. The fluid to the actuator has to pass through the flow sensor 122 which generates a differential pressure proportional to the controlled flow. Thus, a pressure $P_{c1}$ generated in the fluid connection 136 and a pressure $P_{c2}$ in the fluid connection 138 are applied to the respective feed back chambers 14, 16 of pilot 1. The difference between $P_{C1}$ and $P_{c2}$ (i.e. $P_f = P_{c1} - P_{c2}$) acts across the pilot valve 1 and sets up a restoring force $F_F$ on the spool 18 tending to null the throttling effect of the valve thereby blocking the flow of oil to the main control valve. In the equilibrium condition, output flow $Q_o$ will be directly proportional to the current applied to the force motor 10.

It will be appreciated that the valve 12 will function solely as a flow control valve without pilot 2 by providing a fluid connection between port 30 and chamber 98 and a fluid connection between port 32 and chamber 100. Thus, if a flow control valve only is required pilot 2 and also the shuttle valve 140 may be dispensed with. Where the units are of modular construction the position of the ports 30, 32 in pilot 1 is conveniently made the same as the position of the ports 68, 70 (as also 74, 78) in pilot 2 so that pilot 1 and pilot 2 may be fitted separately or jointly to the main valve 80.

FIG. 2 illustrate the multiple control valve in the pressure control mode of operation. In this mode of operation the direction of flow of fluid to and from the actuator and therefore the direction of movement of the actuator is determined by the setting of pilot 1. If current of appropriate polarity is applied to force motor 10 so that spool 18 moves completely to the left, the actuator will move in one direction and if current of appropriate polarity is applied to the force motor so that the spool 18 is caused to move completely to the right (as shown in FIG. 2) then the actuator will move in the opposite direction.

The actuator 116 is initially considered to be moving at a velocity $V_o$ in the direction shown in FIG. 2 against an opposing load. It is required to increase the opposing load to a new value $F_o$. The sequence is initiated by supplying a reference current proportional to the required load pressure drop to the force motor 40, the direction of movement of the actuator being determined (as described above) by the polarity of the current applied to the force motor 10. Thus, while the system is in the pressure control mode of operation, pilot 1 acts as a directional control valve only.

The out of balance force resulting from the increased electric current applied to force motor 40 will displace the spool 48 of pilot 2 through a distance $X_2$ and this in turn will allow flow of fluid $Q_2$ into one and out of the other control chamber 100, 98 of the main valve 80, causing the main valve spool to be displaced by distance $X_o$. The throttling action of the main valve spool controls the main valve flow $Q_o$ to and from the actuator 116. The increased velocity $V_o$ acting through the load resistance characteristics will tend to increase the opposing load acting on the actuator which in turn will increase its load pressure drop.

The load pressure drop for a symmetrical hydraulic jack or motor, i.e. a double acting hydraulic jack or motor with equal effective areas in both directions, is given by the expression:

$$P_L = 2P_2 - P_o$$

when $P_2$ is the higher of the two pressures in the actuator.

$P_2$ is applied via shuttle valve 140 and fluid line 148 to feed back chamber 44 of pilot 2 at the end of the spool 48 opposite to that subjected to the force motor 40. $P_o$ is the supply pressure and as well as being supplied to the main valve, this supply pressure is also applied to the annular end face of the land 58 defining one end of the feed back chamber 46 in pilot 2. As previously mentioned the area of this annular face of the land 58 is half that of the area of the end face of the land 50 in chamber 44. Thus, by virtue of the relationship between the effective areas, the restoring force acting on spool 48 and force motor 40 is therefore directly proportional to the load pressure drop across the actuator. In an alternative arrangement, the feed back chambers 44, 46 can take the form of bias pistons having areas in the ratio 2 to 1.

When the restoring force balances the force exerted by the force motor, the spool 48 of pilot 2 will tend to null, thus blocking the flow of fluid to the main valve chambers 98, 100. If the restoring force momentarily exceeds the input force from the force motor 40, pilot valve 2 will connect both of the main valve control chambers 98 and 100 to tank thereby allowing displacement $X_o$ (under the action of the centering springs) to be reduced and hence main flow $Q_o$ to be reduced. The resulting drop in resistance $F_o$ will in turn reduce the load pressure drop and the consequent reduction of the restoring force acting on the force motor will re-establish the equilibrium condition. sufficient damping is provided to prevent oscillation.

This described sequence of operations assumes that the force exerted by the actuator is a function of its velocity. Under operating conditions where this relationship is not applicable, for example, at zero or very low velocities a flow to pressure convertor is necessary. A shunt is shown in FIG. 3 and comprises a controlled bleed from the higher of the two service line pressures to tank. In order to inhibit the shunt in the velocity control mode and in the event of a signal failure, an additional port 150 is introduced in the left-hand end of pilot 2 which is connected to tank through a preset orifice 152. Land 50 of pilot 2 includes radial and axial borings 156, 154 respectively which communicate between the chamber 44 and the port 150 when the spool 48 is in its null or central position, the port 150 being blocked by the land 50 when the spool is fully displaced in either direction.

Alternatively (not shown) a simple shunt may be provided in series with a solenoid operated blocking valve which renders the shunt inactive in all means of operation except pressure control.

FIG. 5 illustrates in detail an alternative flow sensor. The sensor comprises a bobbin 158 slidable in a cylinder 160 having two annular cavities 162, 164 axially spaced apart and completely covered by the bobbin 158 when the latter is in a central position in the cylinder 160. Between opposite ends of the cylinder, the bobbin is located by means of springs 166 and 168. Lastly, fluid passage means 170, 172 respectively connect the annular cavities 162, 164 with the chambers 174, 176 respectively at opposite ends of the bobbin.

The pressure-flow relationship for a sharp edged orifice is given by $dp \propto q^2$. Where one edge of the orifice is spring loaded, the orifice area becomes a function of the pressure drop across it. The relationship above then becomes $dp \propto q^{2/3}$. By shaping the ends of the bobbin as shown in FIG. 5 so as to introduce a further variable $y = f(x)$ where $x$ is the spacing between the two orifice edges in an axial direction and $y$ the perpendicular (i.e. the shortest) spacing between the fixed orifice edge and the contoured bobbin end, the relationship can be linearised to $dp \propto q$.

$$\text{If} \quad q = k_1 dp \quad \text{then} \quad y = \frac{k_2}{w}\sqrt{\frac{S}{A}}\sqrt{x}.$$

where $k_1$ and $k_2$ are constants, $w =$ the orifice width (maximum $\pi D$), $A$ is the effective area and $S$ the effective spring rate. The above expression is found to be applicable when $x$ is greater than $y$.

Tapping the pressure feed back lines between the shuttle valve 140 and pilot 2 provides a ready means for pressure matching the pump to the services. In FIG. 6 three service lines are connected through check valves 178 to one side of the first stage of a pressure relief valve, the poppet being connected to a bleed from the supply line $P_o$ by means of line 11 (left-hand side of FIG. 6). The relief valve shown in FIG. 6 corresponds to that illustrated and described in British Patent Specification No. 1,109,261.

Since the valve pressure drop under positive loading is given by $P_v = 2(P_o - P_1)$ in one direction and $P_v =$ $_2(P_o - P_2)$ when the actuator moves in the opposite direction, the pre-load of the spring 14a will provide a pressure corresponding to one half of the maximum specified main stage pressure drop.

Pump supply pressure will thus be maintained at an optimum level i.e. exceeding the highest of the required load pressures by a fixed amount corresponding to the required valve pressure drop plus any additional line losses.

A preferred form of main valve is shown in FIG. 7. This allows the main valve to be interposed between the pressure sensitive valve 140 and the actuator and furthermore isolates the actuator from the pressure sensitive valve when the actuator is at rest. In this way the pressure matching device does not see a sustained high pressure from a locked actuator.

The main valve comprises a cylinder 180 and a spool having three lands 182, 184, 186 interlinked by a central shaft 188. Springs 190, 192 act on opposite ends of the spool to centre the spool when no out of balance forces act thereon. Ports (not shown) are provided for supplying fluid to opposite ends of the cylinder, to pilot operate the valve. Main flow ports 194, 196 are provided for supplying fluid to and receiving fluid from the actuator.

Fluid outlet ports 198, 200 are connected to tank and a fluid inlet port 201 receives fluid at $P_o$. Fluid is supplied to the pressure sensitive valve 140 from two of four other ports 202, 204, 206, 208, depending on which direction the piston assembly moves. These four ports 202, 204, 206, 208 are located in close proximity to the ports 198, 201 and 200 and are opened on movement of the actuator. However they are so positioned that they are covered by the lands 182, 184, 186 when the spool is centralised. Thus, as soon as the actuator comes to rest, the ports 202, 204, 206, 208 are covered and no pressure will be seen by the pressure sensitive valve 146 or, therefore, the line 210 which serves to connect the latter to the pressure matching device.

By using the above arrangement in conjunction with a pressure compensated variable displacement pump, pressure matching can be extended to cover power matching.

In both flow and pressure control modes the systems operate under closed loop conditions, where the variables fed-back are the controlled properties, i.e. actuator flow and load pressure drop. This automatically compensates for system parameter variations and effect of disturbances, e.g. variations in supply pressure, oil temperature, main valve characteristics, load pressure (in flow control mode), flow (in pressure control mode).

Since the main valve introduces an integrating stage in both control modes, steady-state errors are minimised.

Main valve operating forces (i.e. Bernoulli and friction) are not transmitted to the pilot stages. The force motor has therefore only to overcome pilot valve operating forces and restoring (feed back) forces.

Restoring forces can be kept to a minimum by (i) keeping the pressure drop across the flow sensor low in the flow control mode and (ii) using small control areas for pilot valve 2 in the pressure control mode. Electrical power input is then greatly determined by dynamic performance requirements.

By using single-stage pilot valves for both flow and pressure control modes, and using flow manipulation to position the main valve spool, pilot stage power dissipation other than inherent leakage due to spool clearances and the presence of shunt in the pressure control mode has been eliminated. In the equilibrium condition in either control mode the pilot valves return to null, thus cutting off control flow to the main valve.

Since both the flow into and out of the actuator is metered, the device has full control under all loading conditions.

In the flow control mode the feed back pressure generated across the flow sensor is only a function of the flow through it and is unaffected by base pressure variations. The system will therefore null out when the required output flow is reached under any loading condition.

In the pressure control mode, pilot valve 2 is a unidirectional device, i.e. it cannot discriminate between positive and negative loading and since it is always connected to the higher of the two service line pressures, it always senses the true load pressure drop: i.e. $P_L = 2P_2 - P_o$ under the positive loading shown in FIG. 3, or $P_L = 2P_1 - P_o$ under negative loading if the direction of jack travel is unaltered.

It follows that any increase in loading either positive or negative will provide a feed back signal tending to reduce the velocity of the actuator irrespective of its direction of movement.

Conversely any reduction in loading, either positive or negative, will provide a feed back signal tending to increase the velocity of the actuator irrespective of its direction of movement. This provides negative feed back under all conditions.

It is found that the pressure $P_s$ is much less than the main supply pressure $P_o$. Thus $P_s$ is preferably derived by way of a pressure reducing valve from the $P_o$ line. Alternatively, as hereinbefore mentioned, it may be derived from a separate source of pressure.

We claim:

1. In combination, a hydraulic actuator and device for optionally controlling the flow of fluid to or the pressure of fluid applied to said hydraulic actuator, said device comprising fluid pressure operated main control valve means for regulating the fluid flow to the actuator; said main control valve means having control pressure chamber means; first and second pilot valve means for controlling the main control valve, each said pilot valve means including inlet and outlet port means and spool means for regulating the fluid between the respective inlet and outlet port means; means connecting the outlet port means of one of said first and second pilot valve means to the inlet port means of the other of said pilot valve means and connecting the outlet port means of said other pilot valve means to said control pressure chamber means of said main control valve means to enable said main control valve means to be operated by said pilot valve means; first and second transducer means for producing a respective input force dependent on a respective electrical input signal and for applying such force to the respective spool means; first opposed piston means associated with said first pilot valve spool means; second piston means associated with said second pilot valve spool means; flow sensing means for producing a pressure difference dependent on the rate of fluid flow to the actuator; pressure sensing means for producing a feedback pressure dependent on the operating pressure of the actuator; first feedback means for applying said pressure difference to said first opposed piston means to apply to said first pilot valve spool means a first feedback force opposed to the respective input force; and second feedback means for applying said feedback pressure to said second piston means to apply to said second pilot valve spool means a second feedback force opposed to the respective input force when the first transducer means is set to normally override the first feedback force, the first feedback force being effective when the second transducer means, is set to normally override the second feedback force.

2. A device according to claim 1 in which said flow sensing means comprises a housing having at opposite ends thereof fluid connections connected in the flow path of the hydraulic fluid regulated by said main valve means and operating said actuator, a movable member in said housing and dividing said housing into two chambers communicating respectively with said fluid connections, cooperating surface means in said housing and on said movable member to define a fluid path interconnecting said chambers and having a restricted flow cross section, said flow cross section being variable dependently upon the position of said movable member in said housing, and spring means biasing said movable member to a position in which said flow cross section is at a minimum, said movable member being movable against said spring means responsively to fluid pressure difference between said chambers in a direction to increase said flow cross section.

3. A device according to claim 2 in which said cooperating surface means are so shaped that the pressure difference between said chambers is substantially directly proportional to the rate of fluid flow through said variable cross section.

4. A device according to claim 2 in which said housing defines a throat between said chambers and said spring means biasses said movable member into registry with said throat to define said position of minimum flow cross section, said movable member being movable axially of said throat in either direction according to the direction of fluid flow between said chambers, said hydraulic actuator being double acting.

5. A device according to claim 4 in which said throat and said movable member have sharp edges of substantially equal diameter, said housing having a wall diverging in opposite directions from said sharp edge of said throat and said sharp edge of said movable member cooperating with said diverging wall to define said variable flow cross section.

6. A device according to claim 1 for a doubleacting hydraulic actuator in which said pressure sensing means comprises shuttle valve means responsive to the direction of actuator movement against a load.

* * * * *